(12) United States Patent
Taub

(10) Patent No.: US 7,001,270 B2
(45) Date of Patent: Feb. 21, 2006

(54) VIRTUAL DENTAL GAME

(75) Inventor: Eldad Taub, Reut (IL)

(73) Assignee: Cadent Ltd., Or Yehuda (IL)

(*) Notice: Subject to any disclaimer, the term of this patent is extended or adjusted under 35 U.S.C. 154(b) by 75 days.

(21) Appl. No.: 10/017,194

(22) Filed: Dec. 12, 2001

(65) Prior Publication Data

US 2002/0115482 A1  Aug. 22, 2002

Related U.S. Application Data

(63) Continuation of application No. PCT/IL00/00353, filed on Jun. 16, 2000.

(30) Foreign Application Priority Data

Jun. 17, 1999  (IL)  ........................ 130513

(51) Int. Cl.
| | |
|---|---|
| A63F 13/00 | (2006.01) |
| A63F 9/24 | (2006.01) |
| G06F 17/00 | (2006.01) |
| G06F 19/00 | (2006.01) |
| G09B 23/28 | (2006.01) |

(52) U.S. Cl. ............... 463/1; 463/7; 463/9; 463/43; 273/317.1; 434/262; 434/263; 433/215

(58) Field of Classification Search ............ 463/1, 463/7, 9, 30–37, 43, 44, 46, 47; 700/90, 700/91; 273/317.1, 148 R, 148 B; 345/619, 345/649, 650, 653, 672, 679, 676; 433/68, 433/24, 69, 215, 216; 434/262–264

See application file for complete search history.

(56) References Cited

U.S. PATENT DOCUMENTS

| | | | | |
|---|---|---|---|---|
| 2,780,002 A | * | 2/1957 | Shea et al. ........... | 434/263 |
| 3,299,512 A | * | 1/1967 | Brigante ............. | 434/264 |
| 4,221,060 A | * | 9/1980 | Moskowitz et al. ..... | 434/264 |
| 4,231,181 A | * | 11/1980 | Fabricant ............ | 446/337 |
| 4,360,345 A | * | 11/1982 | Hon .................. | 434/262 |
| 4,935,635 A | | 6/1990 | O'Harra | |
| 5,120,229 A | * | 6/1992 | Moore et al. ......... | 434/263 |

(Continued)

FOREIGN PATENT DOCUMENTS

DE  3810455 A1  10/1989

(Continued)

*Primary Examiner*—Xuan M. Thai
*Assistant Examiner*—Binh-An D. Nguyen
(74) *Attorney, Agent, or Firm*—Nath & Associates PLLC; Gregory B. Kang; Derek Richmond

(57) ABSTRACT

The present invention relates to a computer game, which, when operating on a computer enables a user, via a user's interface, to perform one or more tasks within a virtual environment, the virtual environment comprising a virtual three dimensional dental image of at least one tooth and the tasks performed by the user leading to the improvement of a certain virtual condition associated with said at least one tooth. The three dimensional dental image employed in the computer game is preferably based on or derived from a real life dental environment. The invention further relates to a storage medium for storing data representation of the above computer game and to a method of playing the computer game of the present invention using a computer.

27 Claims, 4 Drawing Sheets

U.S. PATENT DOCUMENTS

| | | | |
|---|---|---|---|
| 5,232,370 A * | 8/1993 | Hoye | 434/263 |
| 5,237,988 A | 8/1993 | McNeese | |
| 5,605,459 A * | 2/1997 | Kuroda et al. | 433/214 |
| 5,688,118 A * | 11/1997 | Hayka et al. | 433/27 |
| 5,730,654 A | 3/1998 | Brown | |
| 5,905,658 A * | 5/1999 | Baba | 703/7 |
| 5,944,531 A * | 8/1999 | Foley et al. | 434/263 |
| 5,975,893 A * | 11/1999 | Chishti et al. | 433/6 |
| 6,152,731 A * | 11/2000 | Jordan et al. | 433/69 |
| 6,227,850 B1 * | 5/2001 | Chishti et al. | 433/24 |
| 6,532,299 B1 * | 3/2003 | Sachdeva et al. | 382/128 |

FOREIGN PATENT DOCUMENTS

| | | |
|---|---|---|
| DE | 4141311 C1 | 8/1993 |
| WO | WO 97/03622 | 2/1997 |
| WO | WO 98/52493 | 11/1998 |
| WO | WO 98/53428 | 11/1998 |
| WO | WO 99/15100 | 4/1999 |
| WO | WO 99/34747 | 7/1999 |

\* cited by examiner

VIRTUAL DENTAL GAME

This is a continuation of International patent application PCT/IL00/00353, designating the United States, having an international filing date of Jun. 16, 2000, and published in English under PCT Article 21(2) on Dec. 28, 2000, publication No. WO/0078421, which is hereby incorporated herein by reference in its entirety. The entire disclosure of the prior application, is considered as being part of the disclosure of the accompanying application, and is hereby incorporated by reference therein.

FIELD OF THE INVENTION

The present invention is generally in the field of computer games.

BACKGROUND OF THE INVENTION

Computer games gained considerable popularity as one of the major forms of entertainment, particularly for children and teenagers. Computer games are also increasingly used as an educational aid. In such games, a user has to perform a certain task within a virtual environment based on certain game-specific roles. For example, the user has to maneuver a figure through a maze, "destroy" the "bad guys", overcome obstacles, etc., all of course within the virtual environment.

The user controls the game through a user interface which may be the keyboard or the "mouse" of the computer, or may be a game-dedicated interface such as a joystick, a pointer, etc.

In most computer games, the virtual environment is an imaginary environment generated by the computer, although some computer games make use of a virtual environment based on or derived from a real-life environment.

SUMMARY OF THE INVENTION

The present invention provides a novel computer game. In accordance with the present invention, the computer game involves a virtual environment comprising a virtual dental image, for example a virtual image of teeth of the individual playing the game (referred to herein at times as "user"). In the computer game of the invention, the user performs a task which is carried out in this virtual environment. Thus, for example, the user, typically a child, may perform a task of eliminating virtual infectious agents from the teeth, a task of translocating or reorienting the teeth in a manner corresponding somewhat to that in which teeth are translocated or reoriented in an orthodontic treatment, etc.

A game with a virtual environment based on an individual's own teeth, may be constructed from data captured of the individual's teeth prior to the onset of orthodontic treatment. Such a game may, for example, be provided to the user by the orthodontist who captured the virtual three-dimensional (3D) image of the user's teeth. The computer game may be recorded on a memory medium, e.g. a CD-ROM, a magnetic disk, etc.

In accordance with its first aspect the present invention provides a computer game which may be run in a computer and associated storage medium, in which a user, through a user interface, performs one or more tasks within a virtual environment, the game being characterized in that said environment is a virtual environment comprising a virtual three-dimensional dental image consisting of at least one tooth of the user; and said one or more tasks comprise improving a certain virtual condition associated with at least one tooth.

In accordance with another aspect the present invention provides a method for playing a game in a computer comprising:
(a) extracting data from a storage medium, the data being representative of a virtual environment comprising a virtual three-dimensional dental image consisting of at least one tooth, and displaying said virtual environment;
(b) performing, in response to a user's command, one or more tasks within a virtual environment to obtain a modified environment and displaying same; said one or more tasks comprise improving a certain virtual condition associated with at least one tooth; and optionally
(c) storing data representative of said modified environment in a storage medium.

By a still further aspect the invention provides a storage medium storing data being representative of a computer game capable of being run in a computer, in which a user, through a user interface, performs one or more tasks within a virtual environment; said virtual environment comprising a virtual three-dimensional dental image comprising of at least one tooth of the user; and said one or more tasks comprise improving a certain virtual condition associated with the at least one tooth.

By a still further aspect the invention provides a storage medium storing data being representative of a virtual environment generated by the above method.

In accordance with a preferred embodiment, the virtual environment is based on the user's own teeth and comprises a virtual image of at least one of the user's teeth.

DETAILED DESCRIPTION OF THE INVENTION

In the following, the invention may at times be described with reference made to various physical entities, such as "tooth/teeth", "jaw", "bracket", "wire", "band", etc. It should, however, be understood that it implies, in most cases, a virtual presentation of these entities in the virtual game environment. (At times, however, as may be realized from the context, these terms will refer to the real-life physical entities). Similarly, the terms "movement", "reorientation", "translocation", etc., refer, in most cases, to acts carried out within the virtual environment.

In accordance with the present invention a computer game is provided wherein a user has to perform one or more tasks within a virtual environment. The characterizing feature of the invention is that the virtual environment comprises a virtual 3D dental image of teeth, preferably those of the user itself. The virtual image typically comprises a continuous section of the individual's teeth, preferably all teeth of one or both jaws of the individual. The task which the user has to perform is to improve a certain virtual condition which is associated with the teeth. The computer game is typically provided on a storage medium which may be a memory chip, a magnetic disk or diskette, a CD-ROM, etc. The game is played through a user's interface which may be the computer's keyboard, a mouse, a joystick, a dedicated game-specific interface, etc.

The computer game generates a virtual environment which comprises a 3D virtual teeth model, preferably including substantially all teeth of both jaws. The term "substantially" means to denote that while, typically the model will have all teeth of both jaws, at times some teeth, e.g. molar teeth, may not be included.

The user is typically an individual, e.g. a child, undergoing an orthodontic treatment and the virtual environment in such a case is generated from data on the 3-D structure of his dental arches acquired by the orthodontist before, during or after an orthodontic treatment.

A method of acquiring a three-dimensional teeth image is disclosed in PCT Application, Publication No. WO 97/03622. Briefly, in this PCT application a 3D teeth image is obtained from a 3D physical teeth model. The 3D physical teeth model may be a negative teeth model including a matrix with a plurality of cavities or recesses, each corresponding to a tooth; or may be a positive teeth model, that includes a matrix with a plurality of projections or bulges, each corresponding to a tooth. The 3D image is then acquired by removing a portion of the model in a controlled, step-wise manner, and in each step capturing an optical image of the model or of the removed portion. Each of the optical images is then digitized and the plurality of images are then compiled to obtain a 3D digital dental image. Methods and systems for acquiring a 3D dental image are also disclosed in DE-A1-3,810,455, DE-C-4,141,311, U.S. Pat. No. 4,935,635 and U.S. Pat. No. 5,237,988.

Figure 3:
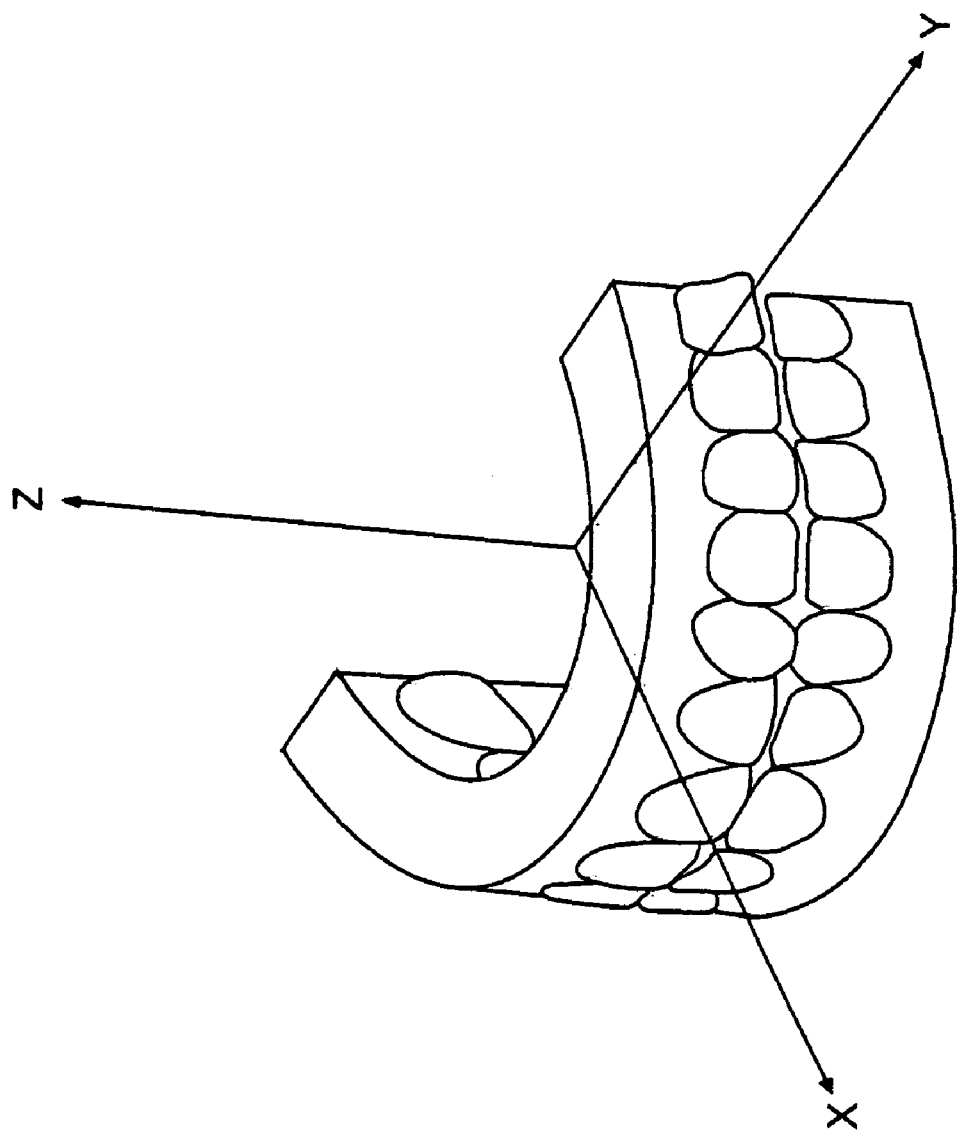
FIG. 3 is a drawing which depicts a representative virtual three dimensional dental image, in accord with one embodiment of the inventive subject matter.
Figure 4:
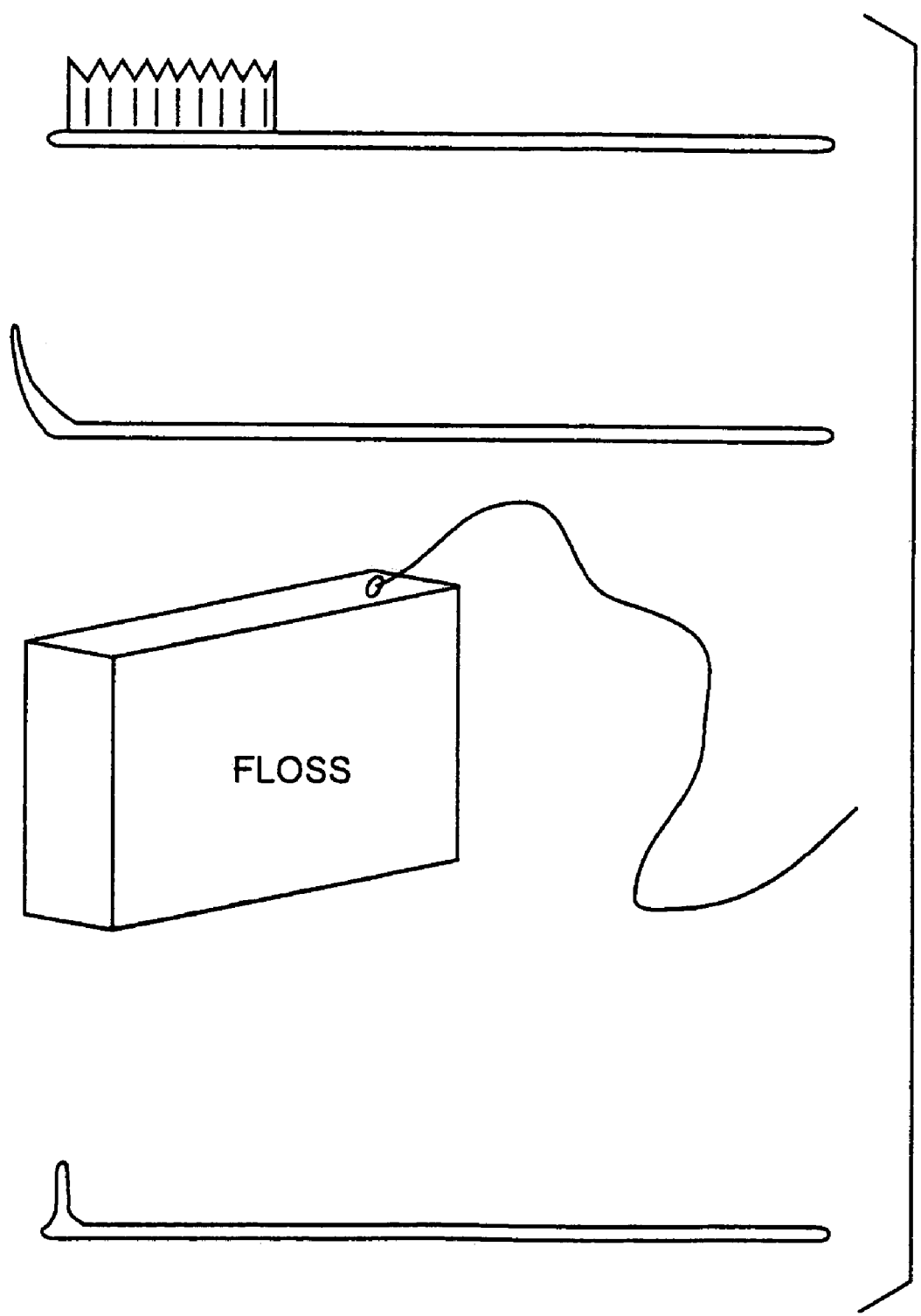
FIG. 4 is a drawing which depicts the following representative virtual dental tools, in accord with one embodiment of the inventive subject matter: toothbrush, tooth pick, dental floss, and gum massaging aid.

A method for obtaining a dental occlusion map which may also be applied to generate the virtual 3D dental image of the virtual environment of the computer game of the invention is disclosed in PCT Application WO 98/52,493. Briefly, in this PCT application, the distance between opposite regions on opposite teeth of the upper and lower jaws of the mouth are determined and then a correspondence between the determined distance and regions on a mapping surface is being set-up. This PCT application is also incorporated herein by reference. FIG. 3 shows a representative virtual 3D dental image as disclosed in PCT Application WO 98/52,493.

In the computer game of the invention the user has to perform one or more tasks of improving a certain virtual condition in the 3D virtual teeth image. Such condition may, in accordance with one embodiment, be a relative position or orientation of one or more teeth or a jaw which differs from an "ideal" position or orientation. An "ideal" position or orientation may be that corresponding to that which would be a desired position or orientation in a real-life orthodontic treatment. This may indeed be the position or orientation corresponding to that aimed to be achieved by the orthodontist. Thus, the virtual teeth may be shifted in position or orientation in a manner which resembles that in which the teeth are translocated or reoriented in the real-life orthodontic treatment.

Moving of teeth or jaws may be achieved by dragging a certain tooth within a permitted limit using a mouse, by pointing on a tooth or jaw to be moved and defining the type of movement or reorientation by the use of a keyboard, etc.

In addition, the user may be given virtual tools or components to perform such movement. Such virtual tools or components may, by one embodiment, be virtual orthodontic components corresponding to real-life orthodontic components. Such virtual orthodontic components may include virtual brackets, a virtual arch-wire, virtual rubber bands or tension springs, etc. In addition to being a source of amusement, performing this task in such a computer game will also be educational to the user on the process of orthodontic treatment he may be undergoing.

Figure 1:
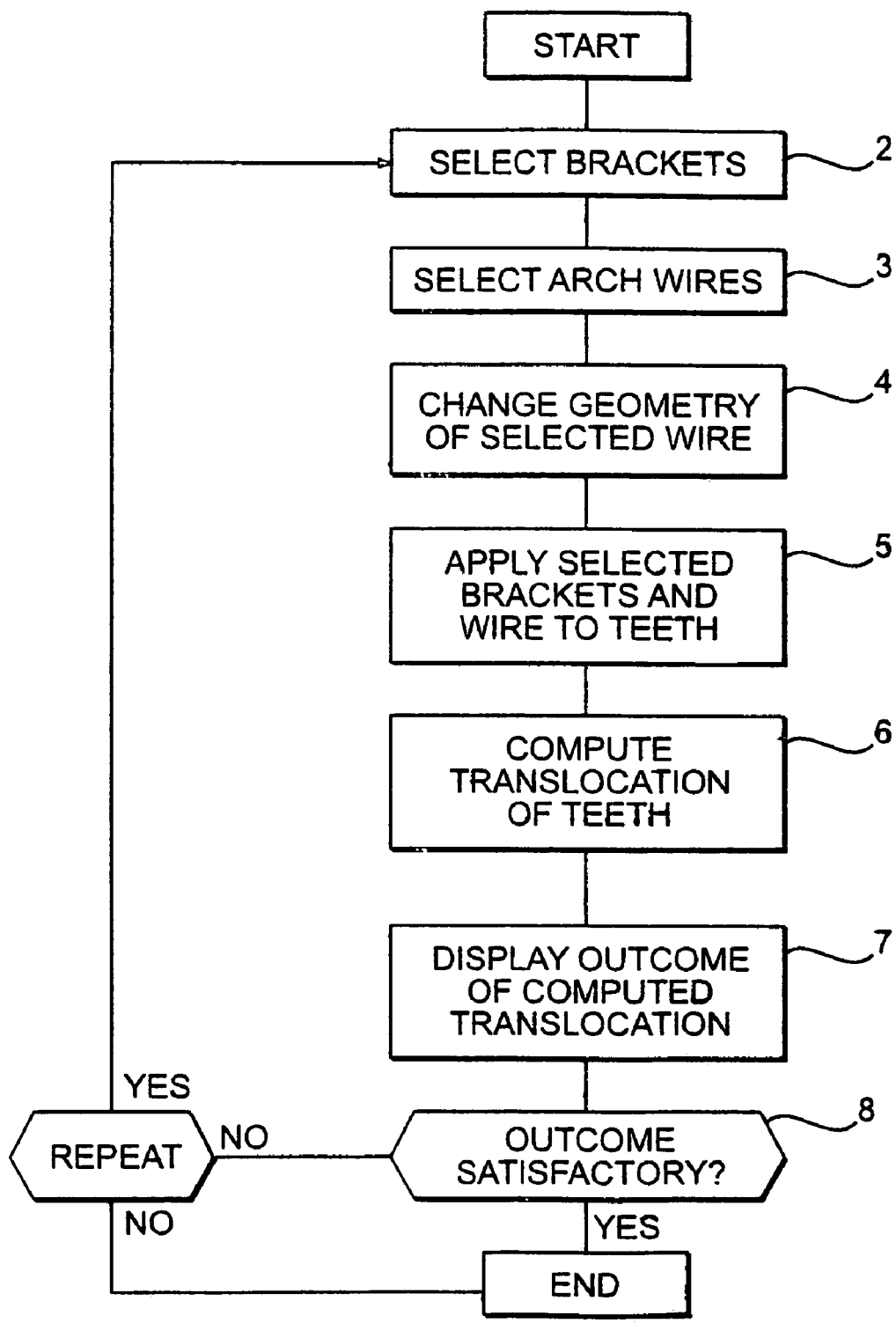
FIG. 1 is a drawing which depicts a flowchart of the steps of a representative method for a user to play a game in a computer, in accord with one embodiment of the inventive subject matter.

FIG. 1 shows an exemplary, yet not exclusive, game sequence for playing the game in accordance with one embodiment of the inventive subject matter. In step 1, the user first selects brackets and in step 2 places the brackets at appropriate positions on the surface of selected teeth, which may be some or all teeth of one jaw. In most cases, brackets are placed on the buccal teeth's surface. In step 3, the user selects an arch-wire from a library of such wires. The library may also include wires of different widths, different cross-sectional shapes and different geometries. In step 4, the geometry of the selected wire is changed. For example the wire may be made to follow a torturous path in a vertical and/or a horizontal plane. In step 5, the wire is associated with the teeth by fitting it into virtual grooves in the brackets placed on the teeth's surface. For example, similar to a real-life procedure, the wire may first be anchored to brackets fitted on the molar teeth and then to the other brackets (all of course in the virtual environment). The relative reorientation or translocation of the teeth and/or jaws resulting from such a game sequence is computed in step 6 based on predetermined rules for such translocation or reorientation in accordance with the virtual force or movement applied by the wires.

The final outcome is then displayed in step 7. In step 8, it is determined whether the outcome, namely the final achieved state, is a perfect or close to a perfect relative position or orientation of the teeth and/or jaws. If yes, the game goal has been achieved and the process terminates. If no, the user is prompted in step 9 to repeat this game sequence. If no, the process terminates. If yes, the process returns to step 2. The user may receive a score based on how close the final result was to a perfect final state.

Figure 2:
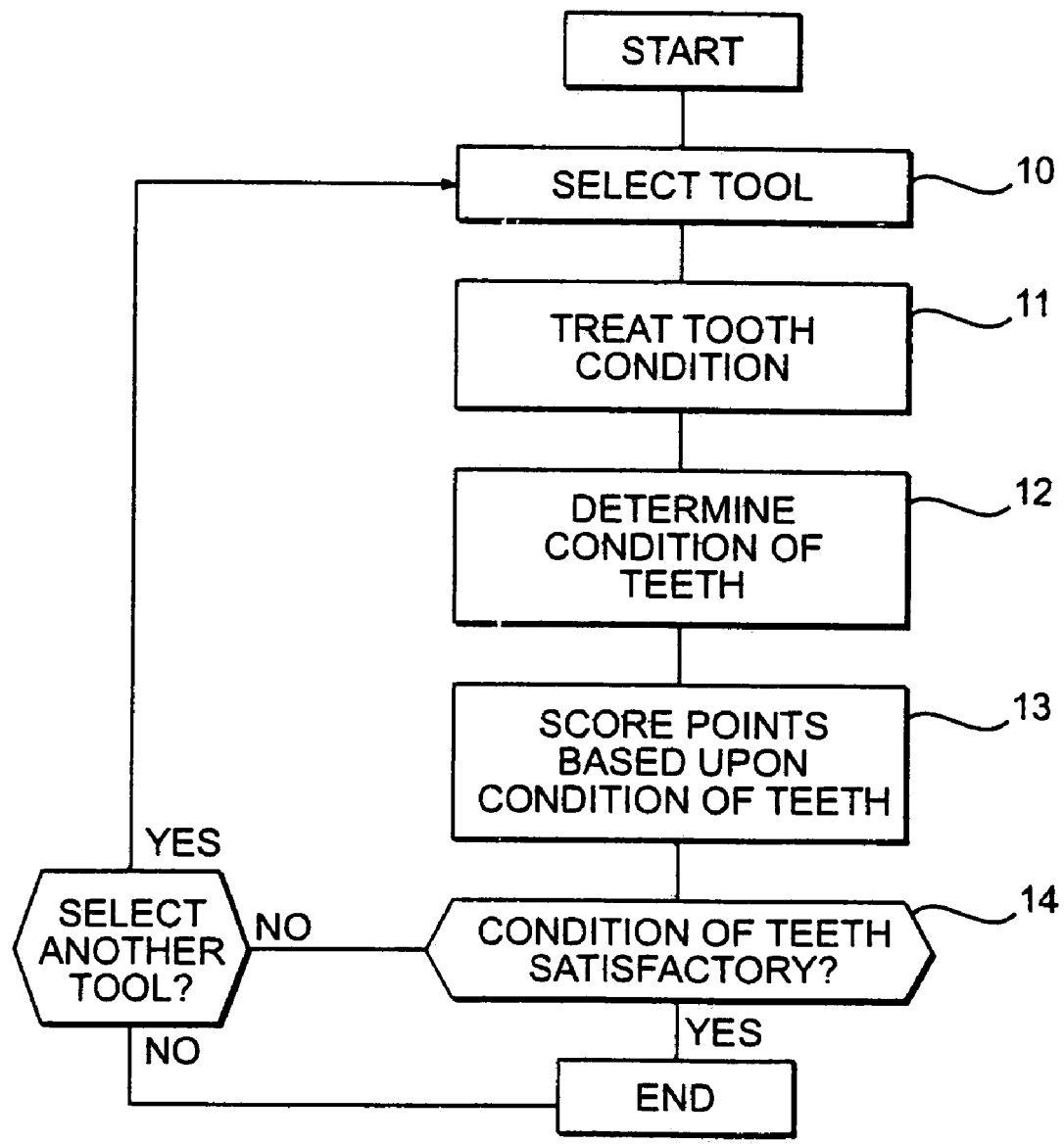
FIG. 2 is a drawing which depicts a flowchart of the steps of a representative method for a user to play a game in a computer, in accord with one embodiment of the inventive subject matter.

FIG. 2 shows an exemplary, yet not inclusive game sequence for playing the game in accordance with another embodiment of the invention, in which the task to be performed by the user is to maintain teeth hygiene. This may involve use of virtual tools, corresponding to such tools used in normal dental hygiene: toothbrush, tooth picks, dental floss, gum massaging aids, etc. In this embodiment, the game may, for example, have the object of fighting tooth or gum decay, damage or infection which may be caused by carries or other infectious agents. In step 10, the user is presented with a library of tools and has to select a tool to treat a certain developing virtual condition, e.g. carries or a gum infection. In step 12, the game rules determine a certain continuous progress of infection which if not properly "treated" by the user will cause decay of one or more teeth, gum infection, potential bleeding, loss of teeth, etc. In step 13, the user may score points depending on his ability to choose the right tools to treat a particular condition or in avoiding a condition from developing. In step 14, it is determined whether the condition of the teeth is satisfactory. If yes, the process terminates. If no, then in step 15, the user is prompted whether he wishes to select another tool. If no, the process terminates. If yes, the process returns to step 10.

Here again, the game, in addition to being amusing and providing an insight of the user into his own teeth, may be educational, particularly for children, on teeth oral hygiene methods and on the importance of maintaining oral hygiene.

In accordance with another embodiment of the invention the game may involve use of a variety of virtual imaginary tools such as virtual guns, wands, etc. in order to fight infectious agents of the teeth or gums.

In accordance with one embodiment of the invention the user may be permitted to manipulate the virtual environment so as to rotate the virtual teeth model, may be provided with controls allowing him to open and close the jaw in a manner similar to that performed in real life, etc. A manner of manipulating a 3D virtual teeth model in a virtual environment is disclosed in PCT Application WO 98/53428, the contents of which is incorporated herein by reference.

What is claimed is:

1. For use in a computer and associated storage medium, a computer game customized for a predetermined user, in which the user, through a user interface, performs one or more tasks generated by the computer within a virtual environment, said environment comprising a virtual three-dimensional dental image of at least one tooth of the user; wherein said one or more tasks comprise at least one of choosing and carrying out a virtual treatment to a certain virtual condition associated with said at least one tooth, determining whether the condition of the teeth is satisfactory,
wherein said condition is a disorder in or lack of structural integrity of one or more teeth, and said one or more tasks comprise improving or fixing said disorder or lack of structural integrity; and
wherein said disorder or lack of structural integrity comprises damage resulting from one or more virtual infectious agents and said one or more tasks comprise elimination of said agents.

2. A computer game according to claim 1, wherein said virtual image comprises a plurality of teeth of at least a continuous section of teeth.

3. A computer game according to claim 2, wherein said virtual image comprises substantially all teeth of at least one jaw.

4. A computer game according to claim 3, wherein said virtual image comprises substantially all teeth of both the upper and lower jaws.

5. A computer game according to claim 4, wherein the user can manipulate the mutual orientation of the two jaws.

6. A computer game according to claim 3, wherein said condition is an inappropriate relative position or orientation of at least one tooth or of a jaw; and said one or more tasks comprise re-orientation of one or more teeth.

7. A computer game according to claim 4, wherein said condition is an inappropriate relative position or orientation of at least one tooth or of a jaw; and said one or more tasks comprise one or more of re-orientation of one or more teeth, or changing relative position of the two jaws.

8. A computer game according to claim 6, wherein said one or more tasks are being performed by applying virtual rules, tools or components, corresponding to manner of dental, personal or orthodontic treatment of teeth or jaws.

9. A computer game according to claim 8, wherein said virtual rules comprise rules of movements of teeth or jaws corresponding to such in a real-life orthodontic treatment.

10. A computer game according to claim 8, wherein said virtual tools or components comprise virtual personal mouth hygiene tools.

11. A computer game according to claim 8, wherein said virtual tools or components are virtual orthodontic components corresponding to real-life orthodontic components.

12. A computer game according to claim 8, wherein said virtual rules permitting elimination of virtual infectious agents from the virtual teeth.

13. A computer game according to claim 7, wherein said one or more tasks are being performed by applying virtual rules, tools or components, corresponding to manner of dental, personal or orthodontic treatment of teeth or jaws.

14. A computer game according to claim 13, wherein said virtual rules comprise rules of movements of teeth or jaws corresponding to such in a real-life orthodontic treatment.

15. A computer game according to claim 13, wherein said virtual tools or components comprise virtual personal mouth hygiene tools.

16. A computer game according to claim 13, wherein said virtual tools or components are virtual orthodontic components corresponding to real-life orthodontic components.

17. A computer game according to claim 13, wherein said virtual rules permitting elimination of virtual infectious agents from the virtual teeth.

18. A computer game according to claim 1, wherein said one or more tasks are being performed by applying virtual rules, tools or components, corresponding to manner of dental, personal or orthodontic treatment of teeth or jaws.

19. A computer game according to claim 18, wherein said virtual rules comprise rules of movements of teeth or jaws corresponding to such in a real-life orthodontic treatment.

20. A computer game according to claim 18, wherein said virtual tools or components comprise virtual personal mouth hygiene tools.

21. A computer game according to claim 18, wherein said virtual tools or components are virtual orthodontic components corresponding to real-life orthodontic components.

22. A computer game according to claim 13, wherein said virtual rules permitting elimination of virtual infectious agents from the virtual teeth.

23. A computer game according to claim 1, wherein said one or more tasks are being performed by applying virtual rules, tools or components, corresponding to manner of dental, personal or orthodontic treatment of teeth or jaws.

24. A computer game according to claim 23, wherein said virtual rules comprise rules of movements of teeth or jaws corresponding to such in a real-life orthodontic treatment.

25. A computer game according to claim 23, wherein said virtual tools or components comprise virtual personal mouth hygiene tools.

26. A computer game according to claim 23, wherein said virtual tools or components are virtual orthodontic components corresponding to real-life orthodontic components.

27. A computer game according to claim 23, wherein said virtual rules permitting elimination of virtual infectious agents from the virtual teeth.

* * * * *